US005690703A

United States Patent [19]
Mitchell et al.

[11] Patent Number: 5,690,703
[45] Date of Patent: Nov. 25, 1997

[54] APPARATUS AND METHOD OF PREPARING ELECTROCHEMICAL CELLS

[75] Inventors: Porter H. Mitchell, Las Vegas, Nev.; David A. Velasquez, Fairfield, Calif.; Ib L Olsen, Cockeysville, Md.; Douglas B. Holmes, Lexington, Mass.

[73] Assignee: Valence Technology, Inc, Henderson, Nev.

[21] Appl. No.: 616,827

[22] Filed: Mar. 15, 1996

[51] Int. Cl.$^6$ .................................................. H01M 10/38
[52] U.S. Cl. ........................ 29/623.5; 29/730; 134/95.2
[58] Field of Search ................................ 29/623.5, 730; 68/5 C; 134/95.2

[56] References Cited

U.S. PATENT DOCUMENTS

| | | | |
|---|---|---|---|
| 3,969,196 | 7/1976 | Zosel | 203/49 |
| 4,012,194 | 3/1977 | Maffei | 8/142 |
| 4,219,333 | 8/1980 | Harris | 8/137 |
| 4,765,798 | 8/1988 | Batson et al. | 29/623.5 X |
| 4,885,007 | 12/1989 | Wegner | 29/623.5 X |
| 5,013,366 | 5/1991 | Jackson et al. | 134/1 |
| 5,123,176 | 6/1992 | Yamada et al. | 34/32 |
| 5,267,455 | 12/1993 | Dewees et al. | 68/5 C |
| 5,540,741 | 7/1996 | Gozdz et al. | 29/623.5 |
| 5,584,893 | 12/1996 | Mitchell | 29/623.5 |

FOREIGN PATENT DOCUMENTS

| | | |
|---|---|---|
| 3323940 | 1/1985 | Germany. |
| WO 9515589 | 6/1995 | WIPO. |

OTHER PUBLICATIONS

Chemac Inc., $CO_2$ Brochure entitled "High Pressure Extraction" (Date Unknown).

Phasex Corporcation Brochure entitled "Supercritical Solutions for Critical Problems" (Date Unknown).

Brogle "$CO_2$ as a Solvent: its Properties and Applications" *Chemistry and Industry*, June 1982.

Hyatt "Liquid and Supercritical Carbon Dioxide as Organic Solvents" *J. Org. Chem.*, (1984) 49:5097-5101 (Date Unknown).

"Supercritical Fluids", Kirk–Othmer Encyclopedia of Chem. Tech., 3d Ed. (1978) Supp. vol. 872-893 (month N/A).

"Blood, Coagulants and Anticoagulants to Cardivascular Agents", Kirk–Othmer Encyclopedia of Chem Tech., 3d Ed. vol. 4, 725-742 1978 (Month N/A).

Asahi Denka Kogyo KK, *Patent Abstracts of Japan*, vol. 13, No. 224, JP 01036605, Feb. 7, 1989.

Primary Examiner—Stephen Kalafut
Attorney, Agent, or Firm—Charles Jew

[57] ABSTRACT

A method for removing plasticizers such dibutyl phthalate from the anode, cathode, and polymeric matrix components of electrochemical cell precursors using carbon dioxide in the supercritical state is provided. The method forms porous polymeric structures that enhances the mass transport of ions in the cell which results in improved electrochemical performance.

15 Claims, 1 Drawing Sheet

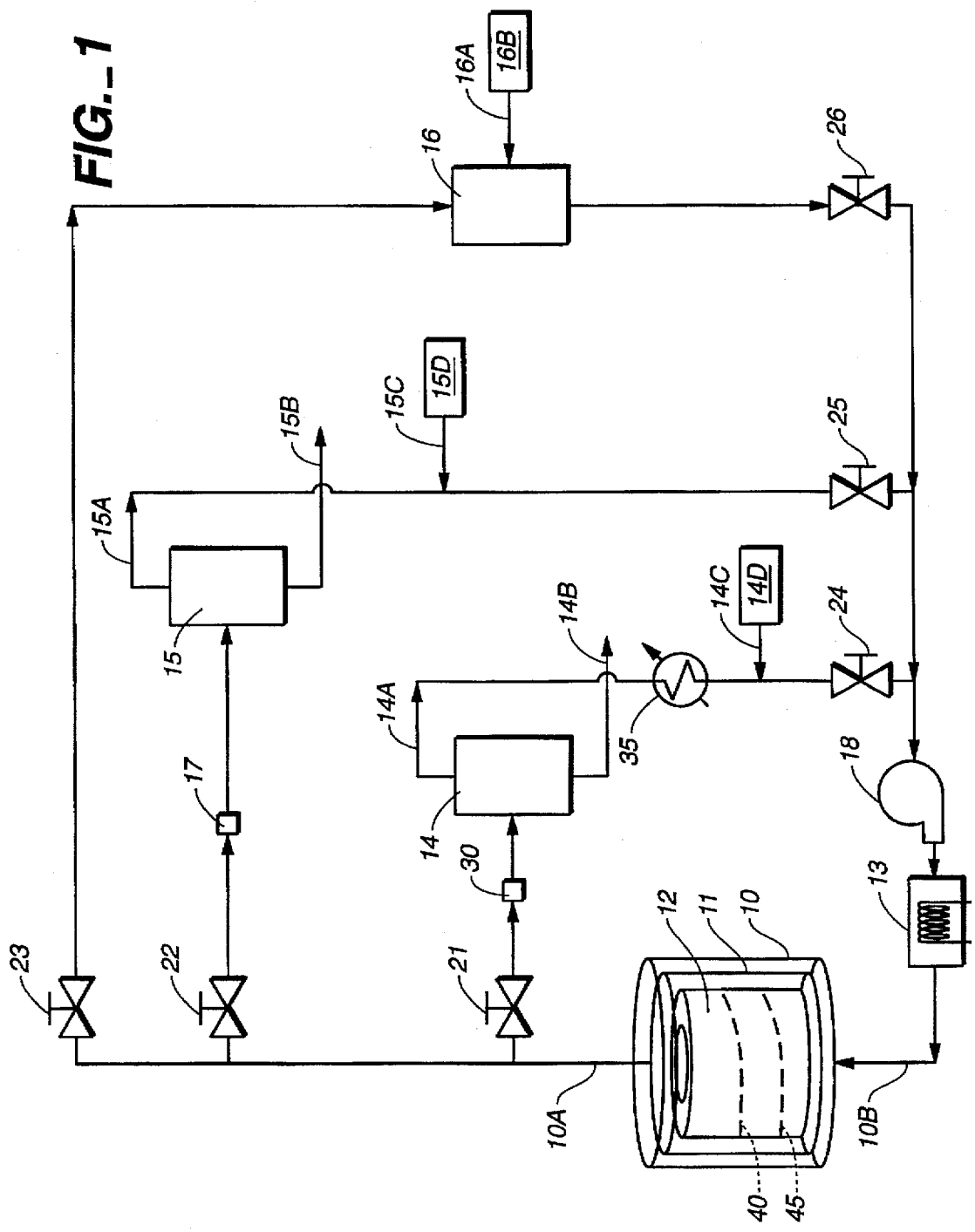
FIG._1

APPARATUS AND METHOD OF PREPARING ELECTROCHEMICAL CELLS

BACKGROUND OF THE INVENTION

1. Field of the Invention

This invention relates to fabricating solid electrochemical (electrolytic) cells and, more particularly, to a method of employing a supercritical fluid to extract solvents from an electrochemical cell (or precursor thereof) in order to develop a porous macrostructure in the anode, cathode, and/or polymeric matrix which enhances the mass transport of the salts in the electrolyte solution.

2. State of the Art

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Various factors influence the performance of electrochemical cells. For instance, the morphology of the polymeric matrix and of the polymeric binders in the anode and/or cathode can affect conductivity of the salts. Enhancement of conductivity has been demonstrated by forming porous polymeric matrices and polymeric binders. One method of producing such porous structures comprises forming polymeric structures in the presence of a plasticizer; upon removal of the plasticizer, pores are created in the polymer. These plasticizers have high boiling points and are difficult to remove. Current methods of removing these solvents include extraction wherein the separating agent is another organic liquid solvent such as dimethyl ether, methanol, and cyclohexane. These processes tend to be expensive and environmentally hazardous.

SUMMARY OF THE INVENTION

In view of the shortcomings in the prior art, there is a need for an inexpensive, non-toxic, and environmentally safe method of removing plasticizers from electrochemical cells.

In one aspect, the invention is directed to a method of preparing an electrochemical cell comprising an anode, a cathode, and a polymeric layer interposed between the anode and cathode which comprises the steps of:

forming an anode composition comprising a carbon material, a first polymer, and a first plasticizer;

forming a cathode composition comprising a cathode active material, a second polymer, and a second plasticizer;

forming a polymeric matrix comprising a third polymer and a third plasticizer;

removing said first, second, and third plasticizers by extraction with a supercritical fluid to form an electrochemical cell precursor; and inserting an electrolyte solution into said electrochemical cell precursor.

In another aspect, the invention is directed to an apparatus for extracting plasticizers from a substrate comprising:

a sealable chamber defining a compartment adapted to receive said substrate wherein said;

means for circulating an extraction solvent into said compartment that comes into contact with said substrate; and means for separating extraction solvent and plasticizer from a mixture of extraction solvent and plasticizer.

In a further aspect, the invention is directed to an apparatus for activating a substrate comprising:

a sealable chamber defining a compartment adapted to receive said substrate wherein said;

means for circulating an extraction solvent into said compartment that comes into contact with said substrate;

means for separating extraction solvent and plasticizer from a mixture of extraction solvent and plasticizer; and means for delivering an electrolyte solution into said compartment that becomes absorbed into said substrate.

Preferred supercritical fluids and extraction solvents include carbon dioxide that is maintained in the supercritical state. Preferred plasticizers include dibutyl phthalate.

BRIEF DESCRIPTION OF THE DRAWINGS

FIG. 1 is a diagrammatic flow sheet showing the system of the invention.

DETAILED DESCRIPTION OF PREFERRED EMBODIMENTS

The present invention is based in part on the discovery that a supercritical fluid such as carbon dioxide can be employed to effectively remove plasticizers such as dibutyl phthalate from the anode, cathode, and/or polymeric matrix of the precursor of an electrochemical cell. Upon removal of the plasticizer, the polymer network of these components has a stable porous structure. Thereafter, the precursor is activated by the addition of an electrolyte solution comprising electrolyte solvents and salts. Electrochemical cells so fabricated demonstrate superior electrochemical performance. The plasticizer is also recovered in a recycle process.

Preferred cells include: a cathode comprising an active material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

Preferably, the anode comprises an anode film that is laminated onto one or both sides of a current collector which is a thin metal foil or grid. Typically, each anode film is from about 100 µm to about 250 µm in thickness, preferably about 110 µm to about 200 µm, and more preferably about 125 µm to about 175 µm.

Similarly, preferably the cathode comprises a cathode film that is laminated onto one or both sides of the current collector which is a thin foil or grid. Typically, each cathode film is from about 100 µm to about 200 µm in thickness, preferably about 130 µm to about 175 µm, and more preferably about 140 µm to about 165 µm.

The anode and cathode each also preferably includes a current collector that comprises, for example, a screen, grid, expanded metal, woven or non-woven fabric formed from an electron conductive material such as metals or alloys. Preferably, the current collector has a thickness from about 25 µm to about 75 µm, preferably about 35 µm to about 65 µm, and more preferably about 45 µm to about 55 µm. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

Prior to describing this invention in further detail, the following terms will be defined.

The term "supercritical fluid" refers to dense gases, compressed gases, supercritical gases, high pressures gases, dense fluids, and the like, that are suitable for extracting plasticizers from polymeric materials. Supercritical fluids are known in the art and are described, for example, in "Supercritical Fluids," Kirk-Othmer Encyclopedia of Chem. Tech." 3d ed. (1978) Sup. Vol. pp. 875–983. Preferred supercritical fluids include, for example, (1) dense gases which are gases that have been compressed and heated to either supercritical or subcritical conditions to achieve liquid-like densities and (2) dense fluids which are fluids that have been heated to achieve similar conditions. Dense gases and fluids are known in the art. See, for example, U.S. Pat. Nos. 5,013,366, 5,267,455, 4,219,333, 4,012,194, and 3,969,196 which are incorporated herein. Suitable dense gases include, for example, carbon dioxide, methane, ethane, propane, butane, ethylene, propylene, ammoniumbutane, sulfur hexafluoride, nitrous oxide and mixtures thereof. Suitable dense fluids include n-pentane, n-hexane, cyclohexane, n-heptane, methanol, ethanol, isopropanol, benzene, toluene, p-xylene, chlorotrifluoromethane, trichlorofluoromethane, perfluoropropane, chlorodifluoromethane, and mixtures thereof. As is apparent, for the present invention, supercritical fluids also include fluids which are present in subcritical conditions. This occurs, for instance, when a dense gas (or mixture of gases) is shifted between its supercritical and subcritical states to enhance its extraction capabilities.

The supercritical fluid is employed to remove plasticizers from an anode composition, a cathode composition, and/or polymeric matrix composition of an electrochemical cell precursor wherein each composition comprises polymers. As the plasticizer is extracted, pores are created in the three dimensional structure of the polymer. The choice of the supercritical fluid employed depends on, among other things, the plasticizer(s) present, the compatibility of the supercritical fluid to the electrochemical cell components, costs, and safety. When dibutyl phthalate is used as the plasticizer, a preferred supercritical fluid is carbon dioxide. The critical temperature of carbon dioxide is 32° C. and the critical pressure is 72.9 atmospheres.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, and acetates, glymes and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite mounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}CO_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one;

5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ $(0\leq y<1)$ which is $Li_yNH_4Mn_8O_{16}$ $(0\leq y<1)$ which has a hollandite-type structure. $Li_y$-α-$MnO_2$ where $0\leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

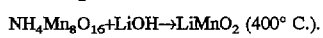

$NH_4Mn_8O_{16}$+LiOH→$LiMnO_2$ (400° C.).

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2 0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the mount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small mount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an mount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form porous anode, cathode, and/or polymeric matrix structures in prior art electrochemical cells. The following illustrates a method of how an electrolytic cell could be fabricated with the inventive process.

An exemplary system for carrying out the process of the present invention is shown diagrammatically in FIG. 1. The system includes a pressure chamber 10 having a compartment which is in communication with extraction solvent (e.g., supercritical fluid) purifier 14 which may comprise a flash distillation unit. Purifier 14 has extraction solvent outlet 14A and plasticizer outlet 14B. The chamber and purifier form the extraction loop which further includes UV sensor 30, pump 18, subcooler 35, and heater 13. The flow rate through this loop can be regulated by valves 21 and 24. Extraction solvent is supplied into the loop through inlet 14C from extraction solvent source 14D. The cylindrical pressure chamber has an end cover which can be removed to create an opening into its interior. Further, the end portions of the chamber are connected to outlet pipe 10A and inlet pipe 10B, respectively. When the chamber is closed, each of these pipes extends part-way into the interior of the chamber so that the openings of the pipes can be coupled to a container that has been placed inside the chamber.

Chamber 10 is also in communication with moisture separator 15 which may comprise a column of activated molecular sieves, alumina or other suitable drying agent. The separator has dry gas outlet 15A and moisture outlet 15B. The chamber and separator form the drying loop which further includes moisture sensor 17, pump 18, and heater 13. The flow rate through this loop can be regulated by valves 22 and 25. Dry gas is supplied into the loop through inlet 15C from gas source 15D.

Finally, the chamber is in communication with electrolyte solution reservoir 16 which can be filled and replenished through inlet 16A from electrolyte solution source 16B. The chamber and reservoir form the activation loop which further includes pump 18, and heater 13. The flow rate through this loop can be regulated by valves 23 and 26.

The system can accommodate electrochemical cell precursors (and batteries precursors) of any configuration. In this example, battery precursor 12 containing a plasticizer has a jelly-roll structure. In operation, the battery precursor is first placed in a hermetically sealable transport vessel 11 that is equipped with pressure operated one-way valves (not shown) located at the top and bottom of the cylindrically-shaped transport vessel. The vessel is configured so that once it is placed into chamber 10 and the chamber is sealed, pipe 10A is coupled to the top one-way valve and pipe 10B is coupled to the bottom one-way valve. The interior of the sealable transport vessel also includes heating coils 40 and cooling coils 45 which can be employed to adjust the temperature of the fluid(s) (e.g., supercritical fluids) inside the sealable transport vessel. Thereafter, extraction solvent from reservoir 16 is pumped into the transport vessel through pipe 10B. Plasticizer is extracted from the battery precursor when it comes into contact with the extraction solvent. The extraction solvent circulates through the extraction loop until the level of plasticizer as indicated by the UV sensor is below a preset level. During the circulation of the extraction solvent, the plasticizer is removed by purifier 14; the extraction solvent also is recovered.

Following extraction of the plasticizer, heated dry gas (e.g., air, nitrogen, argon, carbon dioxide) is pumped through into the transport vessel through pipe 10B. Circulation of the air continues until the concentration reaches a preset level as indicated by the moisture sensor. During the circulation, moisture is removed by separator 15 while dry air is recovered. Finally, the activation step comprises pumping sufficient amounts of the electrolyte solution, which contains an electrolyte solvent and a salt, into the transport vessel and allowing it to permeate into the precursor. The electrolyte solution can be heated and/or pressurized to facilitate absorption.

Any suitable supercritical fluid can be employed as the extraction solvent for the plasticizer; carbon dioxide is preferred. During the extraction process, the temperature and pressure of the dense gas in the transport vessel can be moderated/maintained, for instance, with pump 18 subcooler 35, heater 13, heating coils 40 and/or cooling coils 45. The supercritical fluids which may be used in accordance with the present invention include, for example, any of the known gases or fluids which may be converted to supercritical fluids or liquified at temperatures and pressures which will not degrade the physical or chemical properties of the electrochemical cell precursor and will extract the particular plasticizer used. In some cases, a mixture of two or more supercritical fluids may be formulated in order to have the desired solvent properties.

Carbon dioxide is a preferred supercritical fluid for use in practicing the present invention since it is inexpensive and non toxic and is particularly suited for extracting dibutyl phthalate. The critical temperature of carbon dioxide is 305° K. (32° C.); and the critical pressure is 72.9 atmospheres. At pressures above the critical point, the phase of the carbon dioxide can be shifted between the liquid phase and supercritical fluid phase by varying the temperature above or below the critical temperature of 305° K. Typical process parameters which have been found to be useful include, but are not limited to, the following: variation of the temperature by about 10° to about 100° K. or higher above the critical temperature; variation of the temperature below the critical temperature by about 5° to 10° K.; variation of pressure by about 100 to about 2100 psi above the critical pressure; variation of the pressure below the critical temperature by about 5 to 20 psi; and residence time of the extraction step of about 2 to 45 minutes.

When extracting the plasticizer; the supercritical fluid can be maintained at a supercritical state or at a subcritical state. Alternatively, the supercritical fluid is phase shifted in order to provide a spectrum of solvents which are capable of removing a variety of plasticizers and/or contaminants. "Phase shifting" is used herein to mean a shift between the liquid state and the supercritical state and another, e.g., subcritical state. The phase shifting is accomplished by varying the temperature and/or pressure of the supercritical fluid. For example, phase shift can be achieved by maintaining the pressure at a relatively constant level which is at or above the critical pressure of the supercritical fluid and varying the temperature or by maintaining the temperature and varying pressure. The pressure is predetermined by computation to provide the necessary solvent spectrum during temperature cycling. Phase shifting is described in U.S. Pat. No. 5,013,366 which is incorporated herein.

An electrolytic cell is prepared by first preparing a cathodic slurry that is laminated onto both sides of a current collector. Similarly, an anode composition is laminated on both sides a current collector. Thereafter, the anode and cathode structures are laminated so that polymeric composition is situated therebetween to provide for a solid electrolytic cell precursor. Thereafter, the cell is heated to about 130° C. to 140° C. for about 2 minutes to fuse the three layers. Upon removal of the plasticizer with supercritical fluids, an electrochemical cell precursor is fabricated and ready for activation. The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5–125 (flatten) from Delker, in Branford, Conn.

The anode slurry was prepared as follows:

A polymer mixture comprising a copolymer of vinylidenedifluoride (VDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M. M. M. Carbon, Willebroek, Belgium. Preferred surfactants include Pluronic FC68™ from BASF, Mt. Olive, N.J. and Flurad 430™ from 3M Co., St. Paul, Minn. The surfactant disperses the graphite. The graphite mixture was then vigorously mixed in a high shear mixer until a substantially homogeneous blend was formed. A suitable mixer is available from Ross, Model ME100DLX, Hauppauge, New York, operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, in Branford, Conn.

The cathode slurry was prepared as follows:

A polymer mixture comprising a copolymer of vinylidenedifluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMn_2O_4$ (spinel) ($0 \leq x < 2$) and $Li_y$-$\alpha$-$MnO_2$ ($0 \leq y < 1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The pressure and temperature employed will depend on the polymer(s) forming the polymer matrix. The polymeric matrix is formed by casting a polymeric slurry comprising acetone, dibutyl phthalate, silanized fumed $SiO_2$, and the VDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K.

Furthermore, it is preferred that polymer or copolymer has a narrow molecular weight have range.

Preferably $$M_n/M_w \propto 1.0.$$

Next, the dibutyl phthalate plasticizer is extracted and activated by the above process. In a preferred method, the precursor can be pre-packaged in moisture-impermeable material which is described, for example, in U.S. Pat. No. 5,326,653, which is incorporated herein, before being extracted of the plasticizer and then activated. Thereafter, the packaging is sealed.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method of preparing an electrochemical cell comprising an anode, a cathode, and a polymeric layer positioned between the anode and cathode which comprises the steps of:
   (a) forming an anode composition comprising a carbon material, a first polymer, and a first plasticizer;
   (b) forming a cathode composition comprising a cathode active material, a second polymer, and a second plasticizer;
   (c) forming a polymeric matrix comprising a third polymer and a third plasticizer that is positioned between the anode composition and cathode composition;
   (d) removing said first, second, and third plasticizers by extraction with a supercritical fluid to form an electrochemical cell precursor by a process comprising the steps of:
      (i) providing an apparatus that comprises:
         a sealable chamber defining a compartment adapted to receive an article containing a plasticizer;
         means for circulating a supercritical fluid into said compartment that comes into contact with said article; and
         means for separating supercritical fluid and plasticizer from a mixture of supercritical fluid and plasticizer;
      (ii) placing said anode composition, cathode composition, and polymeric matrix into said compartment and contacting the same with a supercritical fluid, wherein said supercritical fluid during said contacting is maintained under conditions of temperature and pressure such that said supercritical fluid takes up at least a portion of said plasticizers;
      (iii) removing said supercritical fluid loaded with said portion of plasticizer taken up during said contacting; and
   (d) inserting an electrolyte solution comprising an electrolyte solvent and salt into the electrochemical precursor.

2. The method of claim 1 wherein the first, second, and third plasticizers comprise dibutyl phthalate.

3. The method of claim 1 wherein the supercritical fluid is carbon dioxide.

4. The method of claim 1 which further comprises the step of removing moisture from the electrochemical cell precursor before inserting the electrolyte solution.

5. The method of claim 1 wherein the cathode active material is selected from the group consisting of lithiated manganese oxides, lithiated cobalt oxide, lithiated nickel oxides, vanadium oxides and mixture thereof.

6. The method of claim 1 wherein said first, second, and third polymers comprise a copolymer of vinylidene difluoride and hexafluoropropylene.

7. The method of claim 1 wherein step (ii) comprises circulating said supercritical fluid into and out of the compartment.

8. The method of claim 1 wherein step (iii) comprises separating supercritical fluid and plasticizer from a mixture of supercritical fluid and plasticizer exiting the compartment.

9. The method of claim 7 wherein step (iii) comprises separating supercritical fluid and plasticizer from a mixture of supercritical fluid and plasticizer exiting the compartment.

10. The method of claim 2 wherein the first, second, and third polymers comprise a copolymer of vinylidene difluoride and hexafluoropropylene.

11. The method of claim 2 wherein the supercritical fluid comprises carbon dioxide.

12. The method of claim 1 wherein step (ii) comprises phase shifting said supercritical fluid between a supercritical state and a subcritical state or a liquid state.

13. The method of claim 4 wherein the step of removing the moisture comprises circulating gas into said compartment to remove moisture from said electrochemical cell precursor.

14. The method of claim 13 wherein the gas is selected from the group consisting of air, nitrogen, argon and carbon dioxide.

15. The method of claim 14 wherein said gas is heated.

* * * * *